United States Patent
Adamek et al.

(10) Patent No.: US 7,620,250 B2
(45) Date of Patent: Nov. 17, 2009

(54) SHAPE MATCHING METHOD FOR INDEXING AND RETRIEVING MULTIMEDIA DATA

(75) Inventors: Thomas Adamek, Dublin (IE); Noel O'Connor, Dublin (IE); Sean Marlow, Dublin (IE); Noel Murphy, County Meath (IE); Alan Smeaton, County Dublin (IE)

(73) Assignee: Dublin City University, Dublin (IE)

( * ) Notice: Subject to any disclaimer, the term of this patent is extended or adjusted under 35 U.S.C. 154(b) by 396 days.

(21) Appl. No.: 10/551,671

(22) PCT Filed: Mar. 25, 2004

(86) PCT No.: PCT/IE2004/000042

§ 371 (c)(1),
(2), (4) Date: Aug. 25, 2006

(87) PCT Pub. No.: WO2004/088538

PCT Pub. Date: Oct. 14, 2004

(65) Prior Publication Data

US 2007/0022329 A1    Jan. 25, 2007

(30) Foreign Application Priority Data

Apr. 3, 2003    (IE) .............................. S2003/0251

(51) Int. Cl.
*G06K 9/68* (2006.01)

(52) U.S. Cl. ..................... 382/219; 382/151; 382/203; 345/441

(58) Field of Classification Search ................ 382/103, 382/177, 215, 154, 165, 100, 164, 282, 151, 382/174, 203, 238, 291, 289, 242, 241, 199, 382/219; 714/701; 345/419, 468, 441, 471, 345/E13.005, E13.014, E13.015, E13.016, 345/E13.018, E13.019, E13.025, E13.061, 345/E13.062, E13.071; 375/E7.081; 295/21, 295/44, 11, 15; 250/559.23; 700/187
See application file for complete search history.

(56) References Cited

U.S. PATENT DOCUMENTS

| | | | | |
|---|---|---|---|---|
| 5,255,354 | A * | 10/1993 | Mahoney | 382/203 |
| 5,949,906 | A * | 9/1999 | Hontani et al. | 382/177 |
| 5,999,651 | A * | 12/1999 | Chang et al. | 382/215 |
| 6,249,594 | B1 * | 6/2001 | Hibbard | 382/128 |
| 6,343,150 | B1 * | 1/2002 | Darrell et al. | 382/218 |
| 6,393,159 | B1 * | 5/2002 | Prasad et al. | 382/259 |
| 6,697,497 | B1 * | 2/2004 | Jensen et al. | 382/100 |

(Continued)

OTHER PUBLICATIONS

Liang-Kai H. et al: "Efficient Shape Matching Through Model-Based Shape Recognition", Pattern Recognition, Elsevier, Kidlington, GB, vol. 29, No. 2, Feb. 1, 1996, pp. 207-215.

(Continued)

*Primary Examiner*—Sheela C Chawan
(74) *Attorney, Agent, or Firm*—Roylance, Abrams, Berdo & Goodman, L.L.P.

(57) ABSTRACT

The invention relates to a method for indexing and retrieving multimedia data. In particular the invention provides a method of comparing at least two sets of multimedia data using shape information in order to provides a dissimilarity measure between the sets. The invention finds use in retrieving images or parts of sequences based on their content in image and video sequence databases.

20 Claims, 6 Drawing Sheets

U.S. PATENT DOCUMENTS

| | | | |
|---|---|---|---|
| 7,003,161 B2 * | 2/2006 | Tessadro | 382/199 |
| 7,035,431 B2 * | 4/2006 | Blake et al. | 382/103 |
| 7,133,527 B2 * | 11/2006 | Kasperkovitz | 381/2 |
| 7,224,357 B2 * | 5/2007 | Chen et al. | 345/420 |

OTHER PUBLICATIONS

Van Der Heijden G.W.A.M.: "Construction of a Polygonal Model Using the Fisher-Ratio Criterion",Pattern Recognition, 1994. vol. 1-Conference A: Computer Vision & Image Processing, Proceedings of the 12$^{th}$ IAPR, International Conference in Jerusalem, Israel Oct. 9-13, 1994, Los Alamitos, CA, USA, IEEE Comput. SOC, Oct. 9, 1994, pp. 210-215.

Dahai C. et al: "Recognition of Handwritten Digits Based on Contour Information" Pattern Recognition, Elsevier, Kidlington, GB, vol. 31, No. 3, Mar. 1, 1998, pp. 235-255.

Quang Minh T. et al.: "An Application of Wavelet-Based Affine-Invariant Representation", Pattern Recognition Letters, North-Holland Publ., Amsterdam, NL, vol. 16, No. 12, Dec. 1, 1995, pp. 1287-1296.

* cited by examiner

SHAPE MATCHING METHOD FOR INDEXING AND RETRIEVING MULTIMEDIA DATA

FIELD OF THE INVENTION

The invention relates to a method for indexing and retrieving multimedia data. More particularly, the invention relates to calculating a similarity index between at least two sets of multimedia information based on shape feature information extracted from multimedia data objects.

BACKGROUND TO THE INVENTION

Large image and video sequence databases are used in a number of multimedia applications in fields such as entertainment, business, art, engineering, and science. Retrieving images or parts of sequences based on their content, has become an important operation.

Shape analysis methods play an important role in systems for object recognition, matching, registration, and analysis. However, retrieval by shape is still considered to be one of the most difficult aspects of content-based search.

The key to multimedia data retrieval is the following: the types of features of the multimedia data to be considered and how to express these features and how to compare between features.

A common problem in shape analysis research is how to judge the quality of a shape description/matching method. Not all methods are appropriate for all kinds of shapes and every type of application. Generally, a useful shape analysis scheme should satisfy the following conditions:

Robustness to transformations—the result of analysis must be invariant to translation, rotation, and scaling, as well as the starting point used in defining the boundary sequence; this is required because these transformations, by definition, do not change the shape of the object, Feature extraction efficiency—feature vectors (descriptors) should be computed efficiently, Feature matching efficiency—since matching is typically performed on-line, the distance metric must require a very small computational cost, Robustness to deformations—the result of analysis must be robust to spatial noise, introduced by a segmentation process or due to small shape deformations, Correspond to human judgement—a shape similarity/dissimilarity measure should correspond as much as possible to a human's judgement.

Known methods of representing shapes include the descriptors adopted by MPEG-7; Zernike moments [*A. Khotanzan and Y. H. Hong. Invariant image recognition by zernike moments. IEEE Trans. PAMI,* 12:489-497, 1990] and CSS [*Farzin Mokhtarian, Sadegh Abbasi and Josef Kittler. Robust and Efficient Shape Indexing through Curvature Scale Space. British Machine Vision Conference,* 1996]. For the Zernike moment shape descriptor, Zernike basis functions are defined for a variety of shapes in order to investigate the shape of an object within an image. Then, an image of fixed size is projected over the basis functions, and the resultant values are used as the shape descriptors. For the curvature scale space descriptor, the contour of an object is extracted and changes of curvature points along the contour are expressed in a scaled space. Then, the locations with respect to the peak values are expressed as a z-dimensional vector.

The Zernike moments and CSS descriptors have obvious advantages such as very fast feature matching and compact representation. Unfortunately, the majority of the compact shape descriptors (i.e. Zernike moments) are not robust to shape deformations. Others, like CSS, are robust but matching of such descriptors results in many false positives. The retrieval accuracy of the CSS method can be sometimes poor, especially for curves, which have a small number of concavities or convexities. In particular, this representation cannot distinguish between various convex curves. Another disadvantage of the compact descriptors is that their extraction is usually computationally expensive.

Although it is not a problem for creating databases (feature extraction is performed off-line), this makes it difficult (or even impossible) to use them for fast on-line comparison of two shapes provided as binary masks.

OBJECT OF THE INVENTION

It is an object of the invention to provide a computationally efficient shape description/matching method for fast matching of two shapes provided as binary masks. It is a further object of the invention that this method be robust to shape deformations, and does not result in many false positive returns. It is yet a further objective that the technique of the present invention may be implemented in an on-line environment.

SUMMARY OF THE INVENTION

Accordingly the present invention provides an improved technique for effecting a measurement of the dissimilarity of two shapes. In accordance with a preferred embodiment a method of comparing at least two sets of multimedia data using shape information so as to provide a dissimilarity measure between the sets is provided, a first set forming a reference set and the second set being compared relative to the first set, the method comprising steps of;

providing a set of contour points for each set of multimedia data, associating the contour points of the first set with contour points of the second set so as to define associated contour points, calculating distances between said associated contour points, and wherein the distances between said associated contour points are used to determine a dissimilarity measure between said sets of multimedia data, thereby providing an indicator of the degree of similarity between the sets.

The set of contour points for each set of multimedia data is desirably obtained by tracing the boundary of each set of multimedia data.

The sets of contour points may be down-sampled to yield an equal number of approximately equally spaced apart contour points in each set.

The sets of contour points are desirably translation and scale-size normalised prior to association with one another.

The method may include the additional step of establishing starting points for each set of contour points, the starting points being established by defining all contour points for each set whose distances from a calculated centroid point of their respective contour are greater than a user-defined first percentage P1 of the most distant contour point from their respective centroid. The user may be enabled to input the first percentage P1.

Starting points are desirably established in a contiguous manner. The contiguous starting points are typically split into groups which contain less than a user-defined second percentage P2 of the total number of contour points. The user may be enabled to input the second percentage P2.

Each group of starting points is typically represented by the starting point which is most distant from the centroid.

A reference starting point is desirably taken as the most distant starting point on the set of contour points with the largest number of starting points, or the largest initial area, and for each starting point on the set to be compared, the set to be compared is rotated to align its starting point with the reference starting point.

Associated contour points are desirably associated with one another by providing a control point for each of the sets of contour points, and subsequently moving the control points sequentially along the contour of each set, and wherein the movement of the control points about the contour is used to associate contour points from each set with one another.

The movement of the control points for each set is preferably initiated at aligned starting points of each set.

At each step of movement of the control points about the contour, the distance between the two control points, the distance between the control point on the first set and the next contour point on the second set, and the distance between the control point on the second set and the next contour point on the first set is typically calculated, and the contour points with the smallest of these calculated distances are associated with each other.

The contour points are usually assigned until the control points have moved about all of the contour points.

The dissimilarity measure may be determined by effecting a measure of a scale-size normalised circumference of each set, determining the minimum of said circumferences, and further determining the average and the standard deviation of the distance between associated contour points.

The dissimilarity measure is typically provided by the equation:

$$D(A, B) = \frac{c}{cir_{min}^2} \cdot |\overline{D}| \cdot |V|$$

where:

D(A,B) is the dissimilarity degree between set A and set B c denotes a user-defined constant which rescales values of the dissimilarity degree to a convenient range of values, $cir_{min}$ is the minimum circumference $|\overline{D}|$ is the average distance between associated contour points, and $|V|$ is the standard deviation of the distance between associated contour points.

In a preferred embodiment, a plurality of dissimilarity measures are calculated, each dissimilarity measure being associated with a specific alignment of the sets being compared, and wherein a final dissimilarity measure providing an overall indication of a level of equivalence between the sets is given as the lowest of all the calculated dissimilarity measures.

These and other features of the present invention will now be described with reference to the following drawings.

BRIEF DESCRIPTION OF THE DRAWINGS

Some embodiments of the invention are hereinafter described with reference to the accompanying drawings wherein.

DETAILED DESCRIPTION OF THE DRAWINGS

Figure 1:
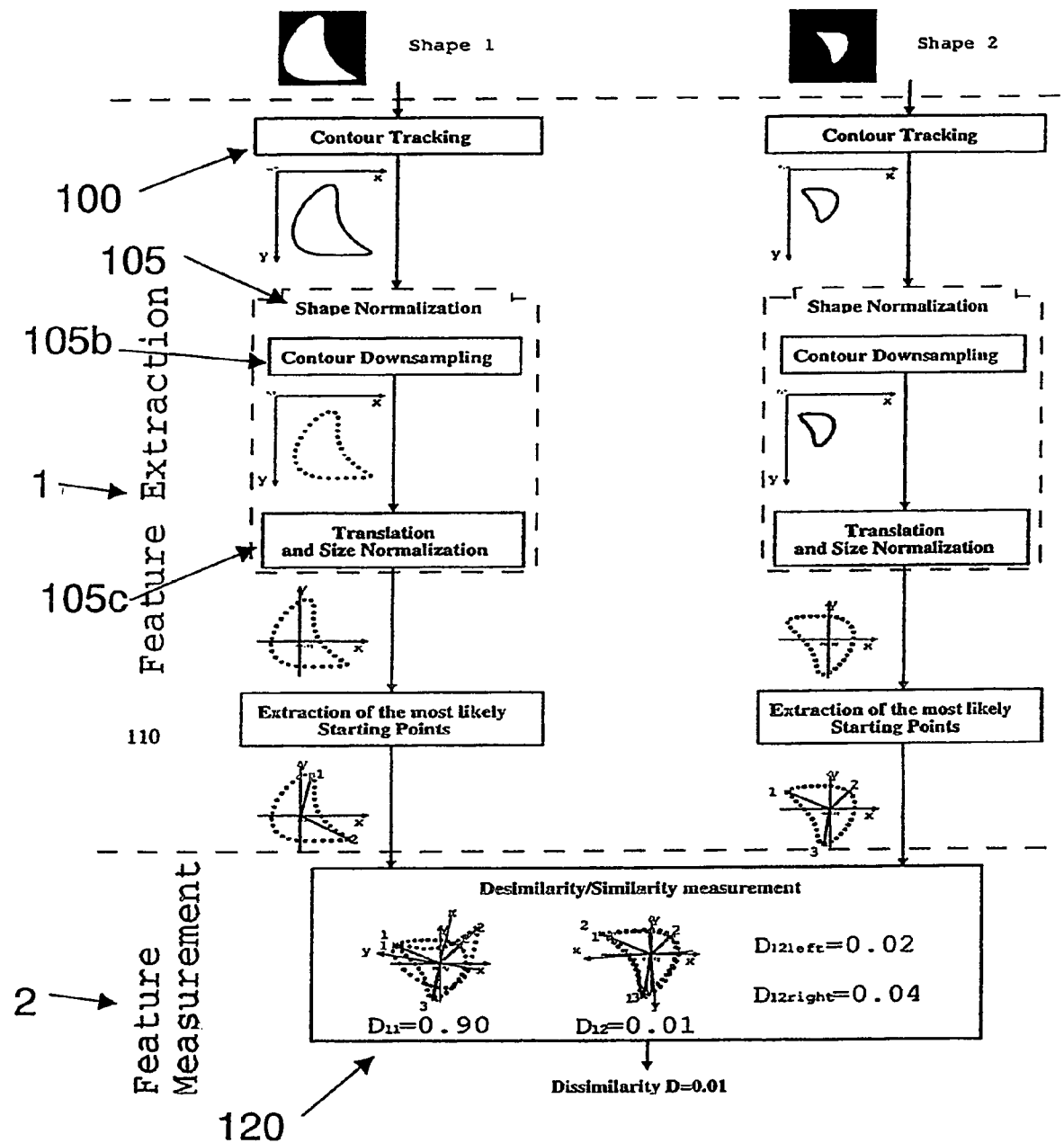
FIG. 1 shows the main steps of a shape analysis algorithm according to the present invention.

According to the present invention a method of comparing at least two sets of multimedia data using shape information to provide a dissimilarity degree is provided. Within the present invention the concept of how to express features may be considered as a shape description whereas the comparison of features may be considered as shape matching. A dissimilarity degree or measure provides an indicator of the similarity between a first set of data and a second set which is tested against the first set. The sets of multimedia data are typically provided in the form of binary images or contours. The methodology of the present invention is typically implemented in a software sequence which is operational in two main stages: feature extraction 1 and feature matching 2. FIG. 1 shows a flow sequence according to the invention adapted to provide for such stages.

In the first stage, the boundaries of the shapes from the input binary images are traced. The extracted contours are translation and scale-size normalized, and the most likely starting points for both shapes are estimated.

In the second stage the dissimilarity measure is calculated using features extracted in the first stage. The starting points from both shapes are assigned into pairs. Before evaluating the dissimilarity measure for a given pair of starting points, the rotation between these points is estimated and one of the shapes is rotated. The dissimilarity between two shapes is calculated for each pair of starting points. The lowest overall dissimilarity is taken as the dissimilarity degree measure between two shapes.

The sequence flow can be further separated into a series of individual steps which are illustrated below as forming a sequential operation.

Contour Tracing (Step 100)

Figure 2:
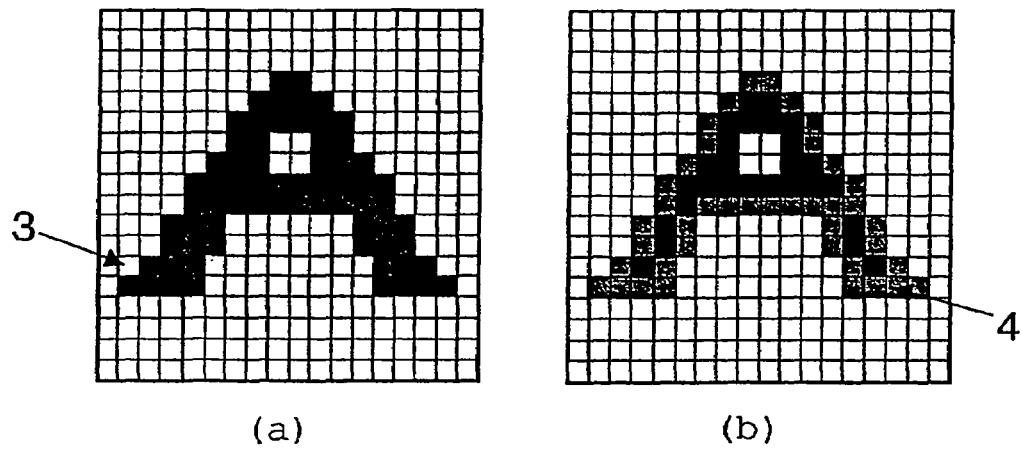
FIG. 2 is an example of contour tracing as implemented according to an aspect of the present invention.

In the contour tracing step, an ordered sequence of the boundary pixels is extracted.—To extract such a set, a technique such as contour tracing (which may also be known to the person skilled in the art as border following or boundary following) is applied to the input binary images. The application of such a tracing algorithm ignores any "holes" present in the shape. For example, with reference to FIG. 2, if a shape like that of an "A" 3 is to be traced, the contour traced by the algorithm will be similar to the external (grey) pixels of the "A" 4.

To explain the tracing algorithm, the concept of the 8-neighborhood [*T. Pavlidis, Algorithms for Graphics and*

Figure 3:
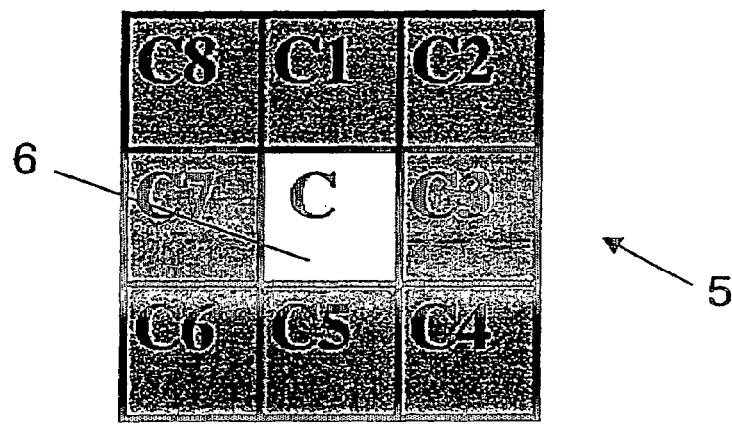
FIG. 3 shows an 8-neighbourhood as utilised in a method step of the present invention.

*Image Processing*, Computer Science Press, Rockville, Md., 1982] of a pixel first needs to be defined. As shown in FIG. 3, the 8-neighborhood 5 of a pixel c 6, is the set of 8 pixels, termed pixels c1, c2, c3, c4, c5, c6, c7 and c8, which share a vertex or edge with that pixel.

Figure 4:
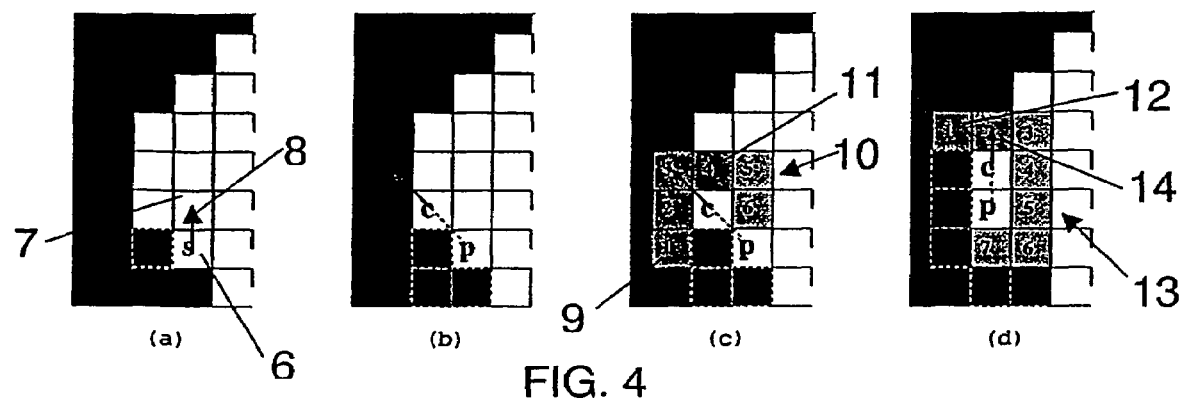
FIG. 4 describes contour tracing steps such as those used in the present invention.

The tracing algorithm operates as illustrated in FIG. 4: Given a digital shape (a group of white pixels on a background of black pixels), a white pixel is located and declared as a starting contour pixel 6. Locating a starting pixel can be performed in a number of ways. Using the assumption that the contour is traced in a clockwise direction, the starting pixel has to satisfy the restriction that the left adjacent pixel is not white. Now, its coordinates are stored and the starting pixel is set as the current contour pixel.

From the current contour pixel, a search is performed in its neighborhood for the next contour pixel. To perform this search the current direction 8 is very important. It can be defined as a line connecting the previous contour pixel with the current contour pixel. The current direction is used to determine from which pixel in the current pixel neighborhood one should start to search for the next contour pixel. Note that the current direction does not change during the current pixel neighborhood search. It changes only when the next contour pixel is made the current contour pixel (one step forward in the contour). When the tracing begins, the current pixel is also the starting pixel. In this case the current direction is defined as the direction connecting the starting pixel with the pixel on top of it 7. This direction can be assumed because of the restriction that was made in choosing the starting pixel.

If the current contour pixel and previous contour pixel only share a vertex (this can be determined directly from the current direction), the searching starts from the pixel 9 which lies 90 degrees to the left of the current direction. In the worse case, the 6 shaded pixels 10 have to be checked. In the presented example the search finishes at the fourth pixel 11.

If the current contour pixel and previous contour pixel share an edge, the search starts from the pixel 12, which lies 45 degrees to the left of the current direction. The pixel on the left of the current contour pixel does not have to be checked, because it was already checked when the previous contour pixel neighborhood was searched. An example is shown in FIG. 4(*d*). This time, in the worse case, the 7 shaded pixels 13 in the current contour pixel neighborhood have to be examined. In the example, searching finishes at the second pixel 14.

When the next white pixel from the tracked contour is found, the algorithm moves to this pixel, making it the current contour pixel. Its coordinates are stored, the current direction is updated and its neighborhood is examined as explained above. This procedure continues until the starting pixel is visited again.

The proposed tracing algorithm can be easily and efficiently implemented. Modulus 8 operations or look-up tables can be used to determine which pixels in the current pixel neighborhood should be checked, and in which order. It will be appreciated that the above described is a preferred tracing algorithm but that any suitable alternative could also be used in the context of the present invention. It is convenient to determine and store the distances between contour pixels during the contour tracing, since the length of the whole contour as well as its separate segments has to be known at the next stage of the shape analysis algorithm. It can be performed in a very efficient manner using a concept known in literature as *Freeman code or chain code* (see: Freeman H. Computer processing of Line-Drawing Images, Computing Surveys Vol6, No 1, March 1974).

A chain code describes the boundary in terms of the directions of the line segments connecting a chain of pixels. The representation can be based on 4- or 8-connectivity. The direction of each segment is encoded using the numbering scheme illustrated in FIG. 3. So, not only the vectors with coordinates of the contour pixels will be stored after contour tracing, but also the vectors of directions between pixels.

Using the extracted contours, the technique then applies a normalization step to each of the two images to be compared (Step 105). This normalization step typically includes two sub-steps: firstly the extracted contours are downsampled and then the downsampled contours are translated and normalised with respect to one another.

Contour Down-Sampling (Step 105*b*)

From the previous stage it will be understood that each set of data is now provided or represented as an ordered sequence (x,y) of the contour pixels and a chain code is also available. The purpose of this stage is to extract a vector of the contour points from the set of contour pixels, which will be equally distributed along the curve.

This stage is required because the similarity degree measure used in the shape analysis scheme of the present invention is based on distances between corresponding shape control points along the shape curve. Arising from this, an approximately equal number of contour points for both compared shapes is required (see FIG. 1). It will be apparent that the number of contour pixels in the shape can vary significantly due to scale changes. Another problem is related to the fact that the vertical and horizontal segments between adjacent contour pixels each have unit length, while the diagonal segments contribute $\sqrt{2}$. Because of this fact, the subjective number of contour pixels in different parts of the contour also changes after rotation. The last reason for introducing the control points is the computational cost of the algorithm, which depends on the number of points representing the contour. Some of the region's contours obtained from a typical CIF sequence (352×288 pixels) can have more than 1000 pixels. Experiments show, that in most cases, 100 points is enough to represent the contour in order to preserve the most significant contour features.

There are many heuristic approaches for approximating contour curves using a small number of vertices or segments. The general approach is splitting or merging contour segments until the chosen approximation error is achieved. In the proposed down-sampling algorithm the main aim is to extract contour points in such a way that they will be almost equally distributed along the contour, i.e. from the whole set of contour pixels a subset of pixels which are approximately equally distant will be chosen. This can be easily performed during one scan of the contour pixel sequence.

The maximum number of contour points for the shape is determined by its number of contour pixels. Since both shapes must have the same number of contour points, the maximum number of contour points for both shapes is defined by the number of contour pixels in the shape which has the smaller number of contour pixels. If the shape descriptors are stored in a database the number of contour points should be fixed for all shapes in this database.

According to the techniques of the present invention a selection of contour points is provided in a very simple and efficient manner. The idea is to move along the contour choosing the pixels for contour points. The position of the pixel along the contour can be efficiently calculated from the chain code.

Figure 5:
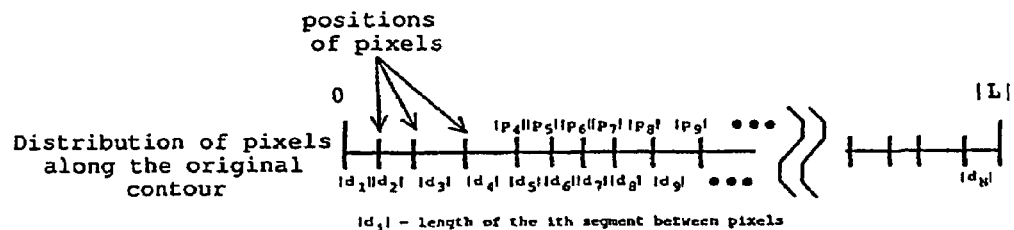
FIG. 5 shows how contour points are chosen according to the present invention.
Figure 5:
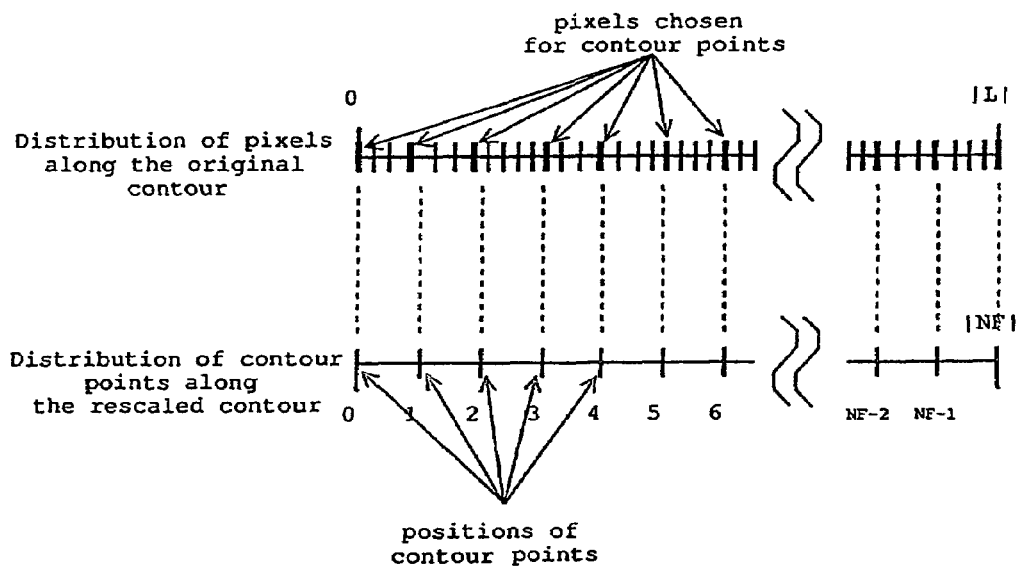

As illustrated in FIG. 5(*b*), only pixels which have the closest position in the contour length to the "ideal" position of the contour points are chosen. The coordinates of the chosen pixels are copied to contour point vectors (one for the x and one for the y coordinate).

From this point on, the contour of the shape is represented by the ordered sequence (x(s),y(s)) of the contour points (vertices), where s denotes the position in the contour and can have integer values from 0 to N, where N denotes the total number of contour points used to represent the shape.

Translation and Scale Normalization (Step 105*c*)

Clearly, moving a region from one location in the image to another and/or changing the size of it should not affect the shape analysis. Since the center of the shape is invariant to translation, rotation and scaling, the present invention utilises a location of the centroid of the shape as part of the method of solving the translation problem. In the presented approach, the centroid of the object curve is translated to coordinates (0,0), which make the object curve translation invariant. Scaling invariance may be obtained by normalizing the shape curve by shape area (see for example: *Dinggang Shen, Horace H. S., Discriminative wavelet shape descriptors for recognition of 2-D patterns, Pattern Recognition* 32, pp 151-156, 1999). This translation and scaling invariance can be achieved using the regular moments as described in the following subsection.

Calculation of the Moments

The definition for a regular moment $m_{pq}$ is:

$$m_{pq} = \int\int x^p y^q f(x,y) dx dy \qquad (1)$$

For binary images, the above equation can be expressed in a discrete form as follows:

$$m_{pq} = \sum_R x^p y^q \qquad (2)$$

In the presented scheme all low order moments needed for shape normalization are derived from the boundary contour points. This approach is much faster in comparison to calculating moments from the above definition equations. For calculating moments from the boundary, a similar method to the one shown in "*Herbert Freeman. Computer processing of Line-Drawing Images, Computing Surveys, Vol 6, No 1, March 1974*" for deriving the area of the shape from a simple chain code may be used. Here this method is extended for moments $m_{01}$ and $m_{10}$.

Figure 6:
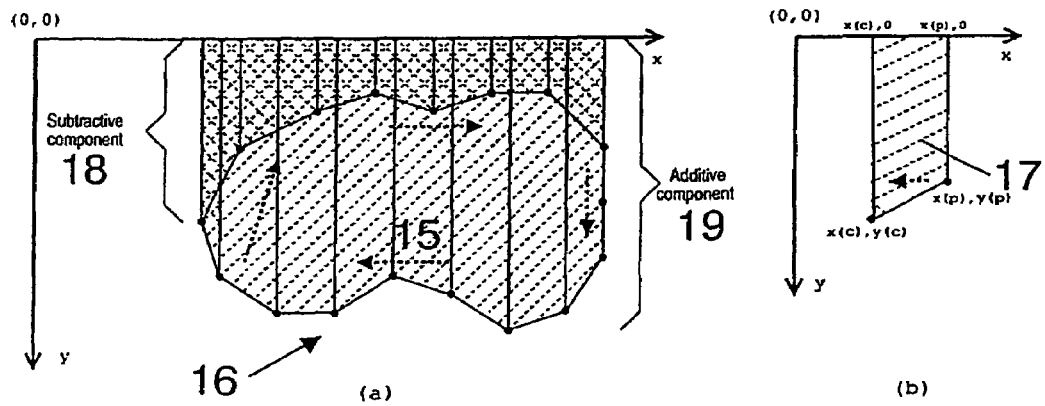
FIG. 6 shows areas used to calculate the moments of the contour according to the present invention.

With reference to FIG. 6(*a*), the algorithm moves from one contour point to another in a clockwise direction 15 around the contour. The moments are calculated as a sum of appropriate moments of trapezoids created from the current and previous contour point and the x (or y) axis. [for moment $m_{01}^t$ trapezoids are created from the current, previous and y axis] An example of such a trapezoid 17 is shown in FIG. 6(*b*) for $m_{00}^t$ and $m_{01}^t$ only The vertices of the trapezoid are (x(c),y(c)), (x(p),y(p)), (x(p),0), and (x(c),0) where c and p denote current and previous contour point respectively.

From equation 2 the formulas for the low order moments of trapezoid ($m_{00}^t$, $m_{10}^t$, $m_{01}^t$) as functions of its vertices can be easily derived:

$$m_{00}^t = \frac{1}{2}[x(p) - x(c)] \cdot [y(c) + y(p)], \qquad (3)$$

$$m_{10}^t = \frac{1}{4}[x(p) - x(c)] \cdot [x(c) + x(p)] \cdot [y(c) + y(p)], \qquad (4)$$

$$m_{01}^t = \frac{1}{4}[y(c) - y(p)] \cdot [x(c) + x(p)] \cdot [y(c) + y(p)]. \qquad (5)$$

Note that $m_{00}^t$ and $m_{10}^t$ have negative values for vertices from the upper border of the shape (subtractive component 18) and positive values for vertices from lower border (additive component 19). Similarly $m_{01}^t$ has negative values for the left part of the shape and positive for the right part (not shown in the figure).

Low order moments of the whole shape can be calculated as a sum of moments of all trapezoids as follows:

$$m_{pq} = \sum_{\forall i \in V} m_{pq}^{t_i} \qquad (6)$$

where V denotes the set of all vertices (contour points) of the shape.

The computation of all necessary moments ($m_{00}^t$, $m_{10}^t$, $m_{01}^t$) of the shape takes time linear to the number of vertices. Equations 3, 4 and 5 can be implemented in a very efficient manner since they have many common components (sums).

Normalization

Using low order moments, the coordinates of the center of the shape can be calculated as follows:

$$x_c = \frac{m_{10}}{m_{00}}, \quad y_c = \frac{m_{01}}{m_{00}} \qquad (7)$$

where $x_c$ and $y_c$ are the coordinates of the centroid of the shape.

Scaling invariance can be obtained by rescaling the coordinates of the shapes vertices by the central moment $m_{00}$. The scaling factor of the present object size, compared with the expected size, is:

$$\alpha = \sqrt{\frac{m_{00}}{AREA}} \qquad (8)$$

where AREA is a chosen constant—the same for all compared shapes.

Finally, the translation and scale normalized shape can be obtained by changing the vertices coordinates according to the following transformation:

$$x'(s) = \frac{x(s) - x_c}{\alpha}, \quad y'(s) = \frac{y(s) - y_c}{\alpha} \qquad (9)$$

Figure 7:
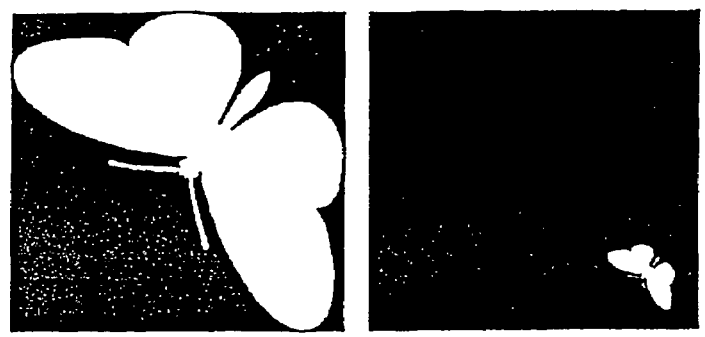
FIG. 7 gives an example of translation and size normalisation using MPEG-7 test images.
Figure 7:
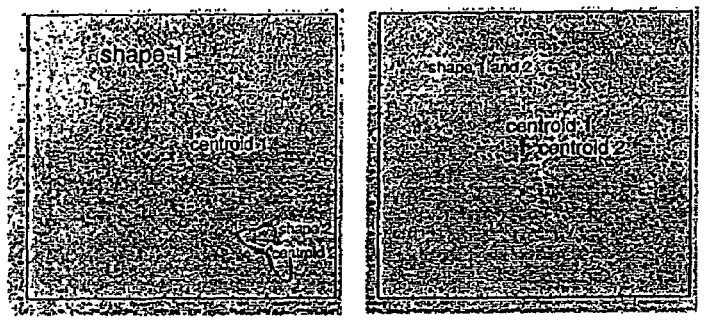

An example of translation and size normalization of the shapes is shown in FIG. 7. The original shape, from the MPEG-7 test set, is shown in FIG. 7(*a*), while FIG. 7(*b*) shows a rescaled (5 times smaller) and translated version of the same shape. Finally, FIG. 7(*c*) shows extracted vertices of the above contours, and FIG. 7(d) shows vertices after translation and scale normalization.

For the rest of this description we let the sequence of (x(s),y(s)) represent the translation and scale normalized contour.

Extraction of the Starting Points (Step 110)

It will be appreciated that a rotation of the object region or changing the point from which the tracing of the boundary of the region started should not affect the shape analysis. One possible solution to this problem could be to evaluate similarity/dissimilarity measure for every pair of contour points.

In the presented approach, the set of the most likely starting points is chosen from the shape to speed up the search. The chosen set depends mainly on the shape and it is assumed that only some of the starting points from the whole set will be affected by its deformations. The number of chosen starting points can be regulated by two parameters. More than one set of starting points can be stored for one shape in the database to allow the user to choose the speed and accuracy of the search for the optimal match.

According to a preferred implementation of the present invention, the following scheme for choosing starting points is used:
1. Find the most distant contour point from the centroid (distance $d_{max}$ from the centroid),
2. The threshold distance $T_d$ is defined. The contour points which are equally or more distant from the centroid than $T_d$ are marked as potential starting points. The threshold distance $T_d$ can be expressed as a fraction of the maximum distance:

$$T_d = p_d \cdot d_{max} \quad (10)$$

where parameter $p_d$ is a real number in the range $\langle 0,1 \rangle$.
3. For each continuous group of marked contour points, one is chosen as the starting point for this part of the contour. Experiments show that the most distant contour point in the group is a good choice. To avoid a situation where too many contour points will be represented by just one starting point, a maximum number of marked points $T_n$ is introduced, which can be represented by one starting point:

$$T_n = \lceil p_n \cdot N \rceil \quad (11)$$

where N denotes the number of all contour points representing the shape and $p_n$ denotes a number within the range $\langle 0,1 \rangle$.

If the group has more points than $T_n$, it is divided into smaller groups which have equal or less points than $T_n$. Each group is then represented by one starting point (the one most distant from the centroid).

The intensity of the search for the optimal rotation between two shapes can be varied by $p_d$ and $p_n$. It is possible by changing parameters $p_d$ and $p_n$ to perform fast, normal or extensive search for optimal rotation alignment. Although the search is performed at a later step, the intensity of the search depends on how many starting points are chosen at this stage. As such it can be a key contributing factor to the overall efficiency of the process. However, in most cases good results can be achieved by choosing the values as $p_d=0.7$ and $$p_n = \frac{1}{20}.$$

Figure 9:
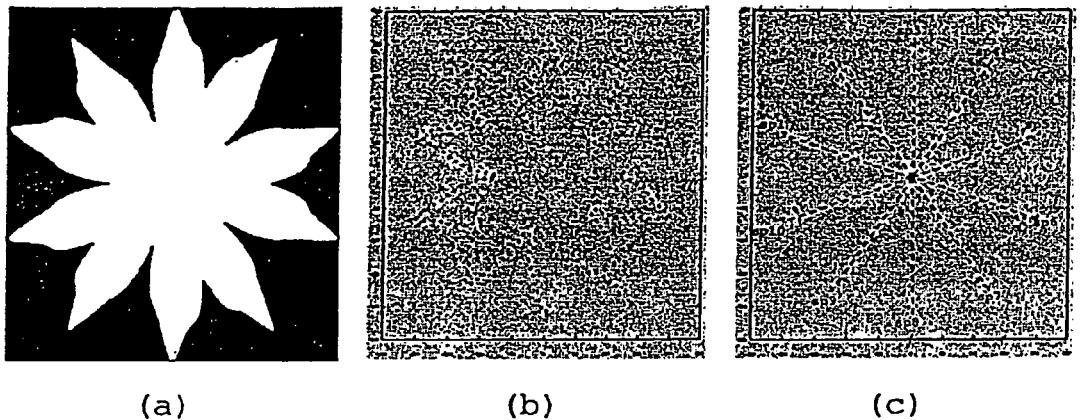
FIG. 9 gives an example of starting point extraction using an MPEG-7 test image.

They lead to around 2 to 4 starting points for elongated shapes and to around 20 for circular shapes. An example of an extracted starting point set is shown in FIG. 9.

Matching (Step 120)

In this stage the search for the best rotation alignment between two shapes is performed. The extracted set of starting points are used to narrow down the search space. For each checked rotation the similarity/dissimilarity measure is calculated. The lowest dissimilarity measure obtained during this search is taken as the final dissimilarity degree between two shapes. The detailed description of calculating a dissimilarity measure for given set of starting points is explained in the next subsection.

In the presented technique the preferred search operates as following:
1. A set of starting point pairs from both shapes for which the similarity/dissimilarity measure will be evaluated is created. In the current implementation the pairs are combined in the following way: $(sp_{ref}, sp_1)$, $(sp_{ref}, sp_2)$, ... $(sp_{ref}, sp_\kappa)$, where $sp_{ref}$ is the most distant starting point from the shape chosen as the reference and $\kappa$ is the total number of starting points from the shape chosen as the rotated one. Usually it is better to choose the shape with a smaller number of starting points to be the one rotated, and the shape with more starting points to be the reference shape (this decision is application-oriented). If both shapes have the same number of starting points, the shape with a smaller initial area (before normalization) is chosen for rotation and that with a bigger area as the reference shape.
2. The rotation for each pair of the starting points (see example in the FIG. 8) is compensated and the dissimilarity is evaluated. The pair with the lowest dissimilarity measure are selected (let it be $(sp_{ref}, sp_x)$).
3. The dissimilarity for pairs of $sp_{ref}$ with starting points from the neighbourhood of $sp_x$ are evaluated as in the step 2. $sp_x$ the neighbourhood is searched and dissimilarity measures for pairs ( ... $(sp_{ref}, sp_{x-2})$, $(sp_{ref}, sp_{x-1})$, $(sp_{ref}, sp_{x+1})$, $(sp_{ref}, sp_{x+2})$ ... ) are calculated. The search is continued in both directions until the dissimilarity values start to increase
4. The lowest dissimilarity measure obtained from all checked starting point pairs is taken as the final dissimilarity measure between the shapes.

Figure 8:
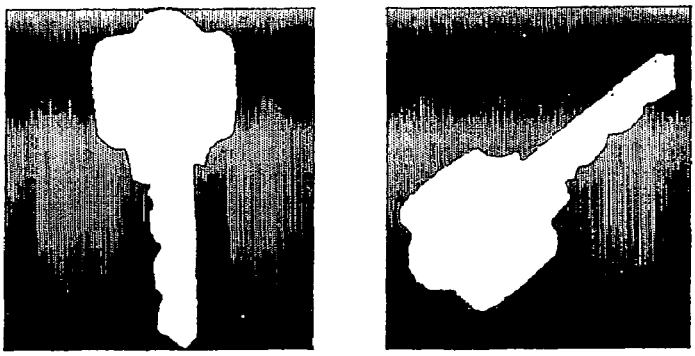
FIG. 8 gives an example of rotation compensation using MPEG-7 test images.
Figure 8:
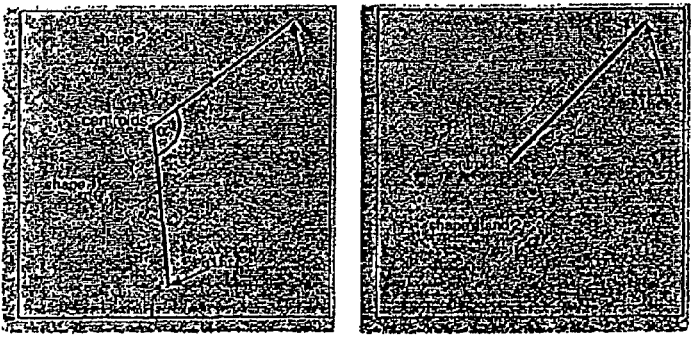

The rotation between starting points can be compensated as illustrated in FIG. 8. The subjective rotation between starting points from both shapes can be estimated as the angle $\alpha$ between these starting points and the aligned centroids of these shapes. The rotation is compensated by rotating one of the shapes around angle $\alpha$. The new coordinates of the contour points for the rotated shape can be calculated from the following equations:

$$x'(s) = x(s)\cos\alpha - y(s)\sin\alpha \quad (12)$$

$$y'(s) = x(s)\sin\alpha + y(s)\cos\alpha \quad (13)$$

Similarity/Dissimilarity Measure

Figure 10:
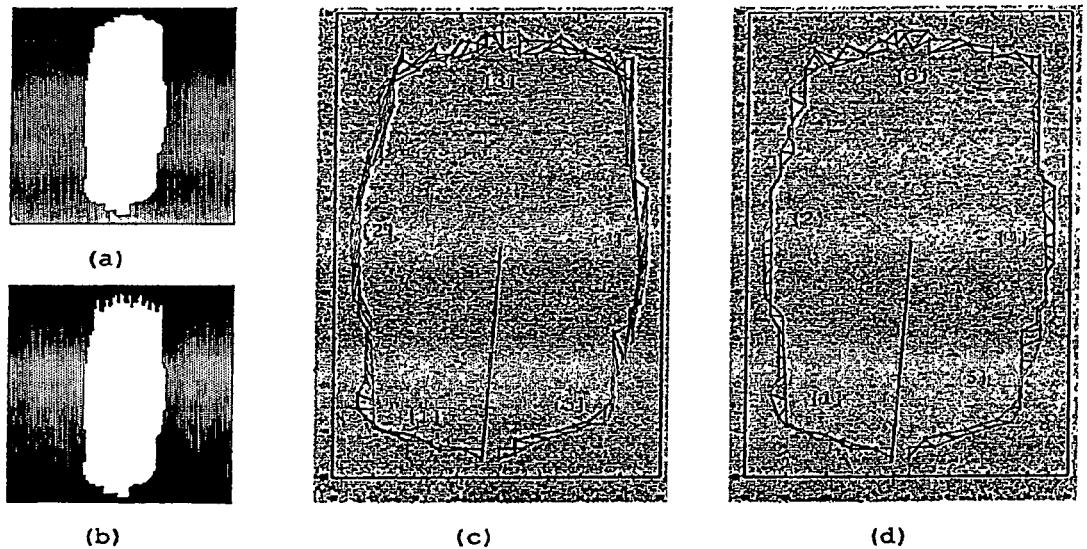
FIG. 10 gives an example of assigning the contour points of two shapes; by simple assignment, and by the present invention.

The presented similarity/dissimilarity metric is based on the distances between the contour points of two shapes. Before calculating the similarity/dissimilarity between two shapes, the correspondence problem between the contour points from both shapes must first be solved. The simple assignment of the contour points could be based on their indexes (staring from the starting points), but it is not robust to shape deformations (especially contour noise). An example of such simple assignment is shown in the FIG. 10. FIGS.

10(a) and (b) show the shapes for which the degree of dissimilarity has to be calculated. Both shapes are identical except that the top of the shape shown in FIG. 10(b) is corrupted by segmentation noise. FIG. 10(c) demonstrates a simple contour points assignment. From this example it is obvious that the above assignment of contour points fails. In the presented method a semi-optimal solution to this problem is proposed. It makes use of two control points moving along the shape. It is deformation and noise robust and yet the complexity is O(N).

Imagine that two control points $cp_A$ and $cp_B$ are moving along the contours A and B, beginning from aligned starting points. They move along contours in N' steps and for each step the distance between them is obtained. Each step consists of two stages. During the first stage, each control point moves one position forward in the contour point sequence. For the new position, the euclidean distance $|d_c(i)|$ between the coordinates of these control points is calculated. During the second stage, the distances between control points and next contour points in another contour ($|d_{AB}(i)|$ and $|d_{BA}(i)|$) are calculated. If one of these is smaller than $|d_c(i)|$ the appropriate control point moves one position forward to minimize the distance between $cp_A$ and $cp_B$. The distance $|d(i)|$ for the step i is obtained as a minimum of the distances $|d_c(i)|$, $|d_{AB}(i)|$ and $|d_{BA}(i)|$.

Figure 11:
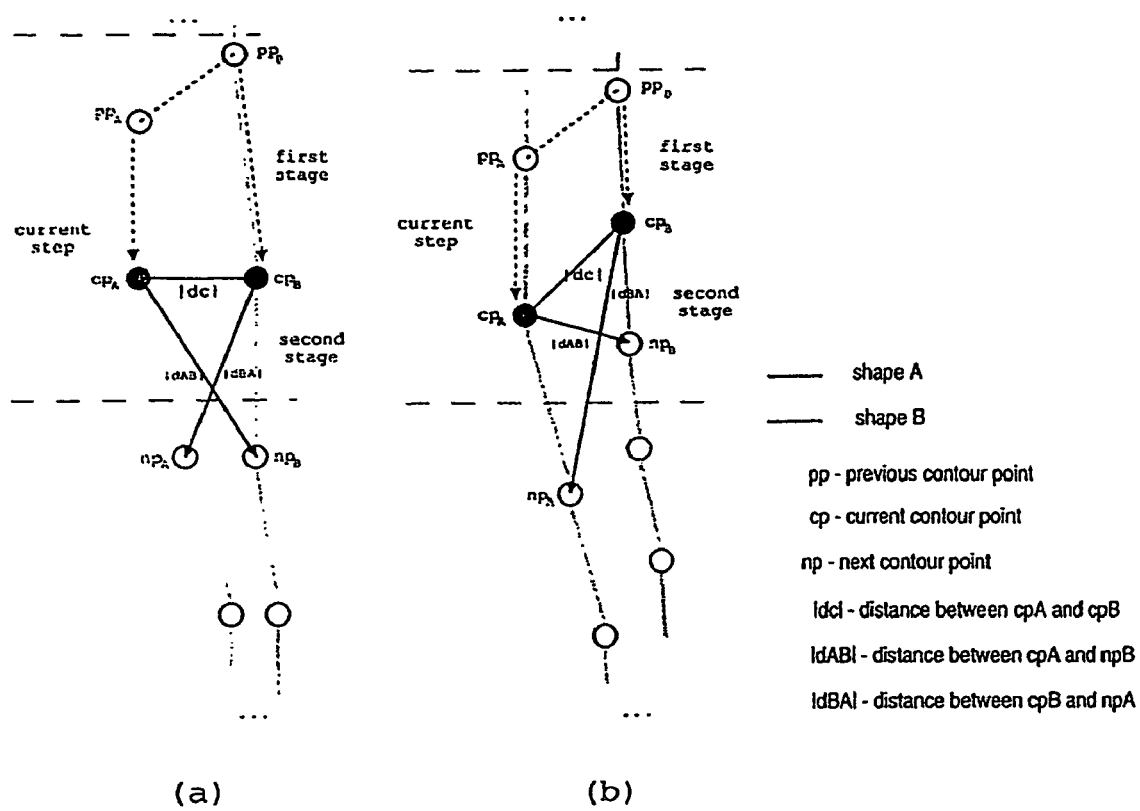
FIG. 11 shows a sample step of a contour point assignment according to the invention.

In this way control points move together along the contours as closely as possible. Usually they move only one position forward during one step, but one of them can move two positions if it produces a smaller distance between them. In other words, in some parts of the contours the control point from shape A can move faster whereas for another parts the control point from shape B can move faster. In this case faster means two positions in the contour point sequence per one step. Note that in such a way some contour points are skipped. An example of a step while skipping one contour point is shown in FIG. 11(b). The distance $|d_{AB}(i)|$ shorter than $|d_c(i)|$ so the control point $cp_B$ in the shape B moves one further step forward, and $|d_{AB}(i)|$ is taken as the distance for this step.

FIG. 10(d) shows the manner in which the contour points in shapes shown in FIGS. 10(a) and (b) were assigned by the moving control points. The improvement (comparing with FIG. 10(c)) is visible by the decreased complexity of the lines showing point assignments, especially for parts {2} and {4} of the shapes.

The distances between the contour points assigned in this way are used to calculate the similarity/dissimilarity between two shapes.

When walking simultaneously along two contours the measured distances between contour points from both shapes should be relatively small. Moreover, they should not change along the curves. If the shapes are similar, the standard deviation of these distances should be small and strongly dependent on the degree of dissimilarity between the shapes. The proposed metric takes advantage of this facts. It is based on both: the geometrical distances between assigned contour points and their variations along both contours.

The average distance between contours can be calculated from the following equation:

$$|\overline{D}| = \frac{1}{N'} \sum_{i=0}^{N'} |d_i| \quad (14)$$

where $|d_i|$ denotes the euclidian distance between the coordinates of the contour points assigned in step i.

$$|V| = \sqrt{\frac{1}{N'} \sum_{i=0}^{N'} (|\overline{D}| - |d_i|)^2} \quad (15)$$

The standard deviation of the distances can be calculated from the following equation:

The proposed dissimilarity degree measure can be defined as:

$$D(A, B) = \frac{c}{cir_{min}^2} \cdot |\overline{D}| \cdot |V|$$

where:
c denotes the chosen constant which rescales values of the dissimilarity degree metric to a convenient range of values (calibration of the algorithm);
$cir_{min}$ is the minimum circumference of the circumferences of both normalized shapes.
$cir_{min}$ adjusts the dissimilarity metric to human perception of dissimilarity of two shapes depending on the complexity of the shapes. It has been observed by the present inventors that humans perceive even small differences between two simple shapes as significant, in contrast with the differences between two more complicated shapes for which small differences are not so important. Assuming, that the shape is size normalized the circumference can be used as a measure of the complexity of the shape.

Such a dissimilarity degree measure gives values close to zero for very similar shapes and values one and greater then one for significantly different shapes. Based on this the percentage similarity degree measure can be defined as:

$$S_\%(A, B) = \begin{cases} 100 - 100 \cdot D(A, B), & \text{for } D(A, B) \in (0, 1) \\ 0, & \text{otherwise} \end{cases} \quad (17)$$

It gives values from 0% to 100% (values close to 0% for significantly different shapes and close to 100% for similar shapes).

It will be appreciated that a method of providing a dissimilarity measure between two sets of data has been described. Such a method according to the present invention enables a real time comparison between a first or reference set of data and a second set which is compared against the first. The use of such techniques is advantageous for retrieval performance when used for searching databases for images having similar shapes to a query image. The presented method outperforms all existing shape matching algorithms in the MPEG7 Core Experiment CE-Shape-1 (part B). Compared to existing methods, the proposed shape analysis technique is very fast for on-line similarity calculations between shapes taken directly from binary images.

By implementing a technique according to the present invention it is possible to efficiently develop applications which require a large number of comparisons between images of binary shapes. One example is advanced image databases. When determining the similarity between images a number of features can be used such as colour and texture. However, another important feature is the shape of the objects present in the scene. As such, this approach is an important tool when indexing large archives of images for browse and search and retrieval. Furthermore, due to its efficiency it could be successfully applied to video clips and find application in shape-based retrieval from video archives. Current producers of video management tools typically use only use features based on a temporal segmentation of the video and extracted keyframes. However, the next generation of these systems will require more sophisticated features and the proposed approach is an ideal candidate for this. Another example application where similar technology is already being used is trademark logo databases. When a new trademark or logo is designed, its shape characteristics can be used to determine whether or not it is too similar to existing trademarks or logos. Using techniques such as provided by the present invention enable a measurement or dissimilarity value to be calculated so as to enable empirical comparisons.

It will be appreciated that the present invention has been described with reference to a preferred embodiment thereof and that any sequence of steps outlined above are illustrative of the techniques of the present invention and that it is not intended to limit the application to any one set of steps of sequence thereof except as may be deemed necessary in the light of the appended claims.

The invention claimed is:

1. A computer program embodied in a computer-readable medium for comparing at least two sets of multimedia data with shape information so as to provide a dissimilarity measure between the sets, a first set forming a reference set and the second set being compared relative to the first set, comprising:
    a) a first set of instructions for providing shape information in the form of a set of approximately equidistant contour points for each set of multimedia data;
    b) a second set of instructions for associating the contour points of the first set with contour points of the second set so as to define associated contour points; and
    c) a third set of instructions for calculating distances between said associated contour points,
        wherein the distances between said associated contour points are used to determine a dissimilarity measure between said sets of multimedia data, thereby providing an indicator of the degree of similarity between the sets.

2. The computer program of claim 1, wherein the set of contour points for each set of multimedia data is obtained by tracing the boundary of each set of multimedia data.

3. The computer program of claim 1 wherein the sets of contour points are down-sampled to yield an equal number of approximately equally spaced apart contour points in each set.

4. The computer program of claim 1 wherein the sets of contour points are translation and scale-size normalised prior to association with one another.

5. The computer program of claim 1 further comprising a fourth set of instructions for establishing starting points for each set of contour points, the starting points being established by defining all contour points for each set whose distances from a calculated centroid point of their respective contour are greater than a user-defined first percentage P1 of the most distant contour point from their respective centroid.

6. The computer program of claim 5 further comprising a fifth set of instructions for enabling the user to input the first percentage P1.

7. The computer program of claim 5 wherein starting points are established in a contiguous manner.

8. The computer program of claim 7 wherein contiguous starting points are split into groups which contain less than a user-defined second percentage P2 of the total number of contour points.

9. The computer program of claim 8 further comprising a sixth set of instructions for enabling the user to input the second percentage P2.

10. The computer program of claim 8 wherein each group of starting points is represented by the starting point which is most distant from the centroid.

11. The computer program of claim 5 wherein a reference starting point is taken as the most distant starting point on the set of contour points with the largest number of starting points, or the largest initial area, and for each starting point on the set to be compared, the set to be compared is rotated to align its starting point with the reference starting point.

12. The computer program of claim 1 wherein the associated contour points are associated with one another by providing a control point for each of the sets of contour points, and subsequently moving the control points sequentially along the contour of each set, and wherein the movement of the control points about the contour is used to associate contour points from each set with one another.

13. The computer program of claim 12, further comprising a seventh set of instructions for establishing starting points for each set of contour points, the starting points being established by defining all contour points for each set whose distances from a calculated centroid point of their respective contour are greater than a user-defined first percentage P1 of the most distant contour point from their respective centroid, and wherein the movement of the control points for each set is initiated at aligned starting points of each set.

14. The computer program of claim 12 wherein at each step of movement of the control points about the contour, the distance between the two control points, the distance between the control point on the first set and the next contour point on the second set, and the distance between the control point on the second set and the next contour point on the first set is calculated, and the contour points with the smallest of these calculated distances are associated with each other.

15. The computer program of claim 12 wherein the contour points are assigned until the control points have moved about all of the contour points.

16. The computer program of claim 1 wherein the dissimilarity measure is determined by effecting a measure of a scale-size normalised circumference of each set, determining the minimum of said circumferences, and further determining the average and the standard deviation of the distance between associated contour points.

17. The computer program of claim 16 wherein the dissimilarity measure is provided by the equation:

$$D(A, B) = \frac{c}{cir_{min}^2} \cdot |\overline{D}| \cdot |V|$$

where:
D(A,B) is the dissimilarity degree between set A and set B
c denotes a user-defined constant which rescales values of the dissimilarity degree to a convenient range of values,
$cir_{min}$ is the minimum circumference
$|\overline{D}|$ is the average distance between associated contour points, and
$|V|$ is the standard deviation of the distance between associated contour points.

18. The computer program of claim 1 wherein a plurality of dissimilarity measures are calculated, each dissimilarity measure being associated with a specific alignment of the sets being compared, and wherein a final dissimilarity measure providing an overall indication of a level of equivalence between the sets is given as the lowest of all the calculated dissimilarity measures.

19. A computer-implemented method for comparing at least two sets of multimedia data with shape information so as to provide a dissimilarity measure between the sets, a first set forming a reference set and the second set being compared relative to the first set, the method comprising causing a computer to carry out the steps of:
 a) providing shape information in the form of a set of approximately equidistant contour points for each set of multimedia data;
 b) associating the contour points of the first set with contour points of the second set so as to define associated contour points; and
 c) calculating distances between said associated contour points,
  wherein the distances between said associated contour points are used by said computer to determine a dissimilarity measure between said sets of multimedia data, said computer thereby providing an indicator of the degree of similarity between the sets.

20. A system for comparing at least two sets of multimedia data with shape information so as to provide a dissimilarity measure between the sets, a first set forming a reference set and the second set being compared relative to the first set, the system comprising:
 a) means for providing shape information in the form of a set of approximately equidistant contour points for each set of multimedia data;
 b) means for associating the contour points of the first set with contour points of the second set so as to define associated contour points; and
 c) means for calculating distances between said associated contour points,
  wherein the distances between said associated contour points are used by said system to determine a dissimilarity measure between said sets of multimedia data, said system thereby providing an indicator of the degree of similarity between the sets.

* * * * *